United States Patent
Lian et al.

(10) Patent No.: US 9,729,389 B2
(45) Date of Patent: Aug. 8, 2017

(54) METHODS AND SYSTEMS FOR SWITCHING NETWORK TRAFFIC IN A COMMUNICATIONS NETWORK

(71) Applicant: Ixia, Calabasas, CA (US)

(72) Inventors: Wei Lian, Fremont, CA (US); Wenxing Quan, Fremont, CA (US); Randy Fung, San Jose, CA (US); Marcel Felix Desdier, Pleasanton, CA (US)

(73) Assignee: IXIA, Calabasas, CA (US)

( * ) Notice: Subject to any disclaimer, the term of this patent is extended or adjusted under 35 U.S.C. 154(b) by 59 days.

(21) Appl. No.: 14/804,300

(22) Filed: Jul. 20, 2015

(65) Prior Publication Data

US 2017/0026227 A1    Jan. 26, 2017

(51) Int. Cl.
*H04L 12/26* (2006.01)
*H04L 12/24* (2006.01)
*H04L 12/701* (2013.01)

(52) U.S. Cl.
CPC .......... *H04L 41/0668* (2013.01); *H04L 45/00* (2013.01); *H04L 43/0817* (2013.01)

(58) Field of Classification Search
None
See application file for complete search history.

(56) References Cited

U.S. PATENT DOCUMENTS

2013/0124707 A1*   5/2013 Ananthapadmanabha  H04L 45/7457
                                                                      709/223
2013/0318243 A1*  11/2013 Chinthalapati ......... H04L 45/52
                                                                      709/226

OTHER PUBLICATIONS

"Ixia Net Optics iBypass 40-10," Ixia Data Sheet, Document No. 915-6931-01 Rev A, pp. 1-4 (Dec. 2014).

* cited by examiner

*Primary Examiner* — Minh-Trang Nguyen
(74) *Attorney, Agent, or Firm* — Jenkins, Wilson, Taylor & Hunt, P.A.

(57) ABSTRACT

A switching system includes memory and a switching circuit. The memory stores a port priority table and a trigger source and condition table. The switching circuit for switches network traffic between a number of ports based on the port priority table, the trigger source and condition table, and port health status data. Switching network traffic includes: determining a priority path for a first port using the port health status data and the trigger source and condition table; determining a second port specified as a destination for network traffic arriving at the first port by the port priority table for the priority path; and routing incoming network traffic from the first port to the second port.

19 Claims, 5 Drawing Sheets

METHODS AND SYSTEMS FOR SWITCHING NETWORK TRAFFIC IN A COMMUNICATIONS NETWORK

TECHNICAL FIELD

The subject matter described in this specification relates generally to switching network traffic in a communications network, e.g., switching between ports of a switching system.

BACKGROUND

Communications networks are delivering more services and carrying greater amounts of multi-protocol traffic at higher data rates. Increased security threats and tighter regulatory compliance requirements can further complicate network operations. Monitoring tools and security tools can be deployed inline to inspect packets and block incoming threats before these threats affect the network and potentially disrupt business.

Deployment of any inline tool in the network carries the risk of the tool becoming a point of failure. Should the inline tool become unavailable it can bring the network link down, making a critical segment of the network unavailable and affecting uptime. To avoid this risk, a bypass switch can sit in front of an inline security or monitoring tool to guarantee network availability. A bypass switch can serve as a bridge between the network and the inline tool. It lets the inline tool inspect and control network traffic as needed while protecting the network from failures within the tool itself by automatically shunting traffic around the tool when the tool is incapable of passing traffic.

SUMMARY

The subject matter described in this specification relates to switching network traffic in a communications network, e.g., switching between ports of a switching system. The described switching scheme can improve switching speed, network availability, and/or redundancy protection in a network. In some examples, the system includes memory and a switching circuit. The memory stores a port priority table and a trigger source and condition table. The switching circuit for switches network traffic between a number of ports based on the port priority table, the trigger source and condition table, and port health status data. Switching network traffic includes: determining a priority path for a first port using the port health status data and the trigger source and condition table; determining a second port specified as a destination for network traffic arriving at the first port by the port priority table for the priority path; and routing incoming network traffic from the first port to the second port.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
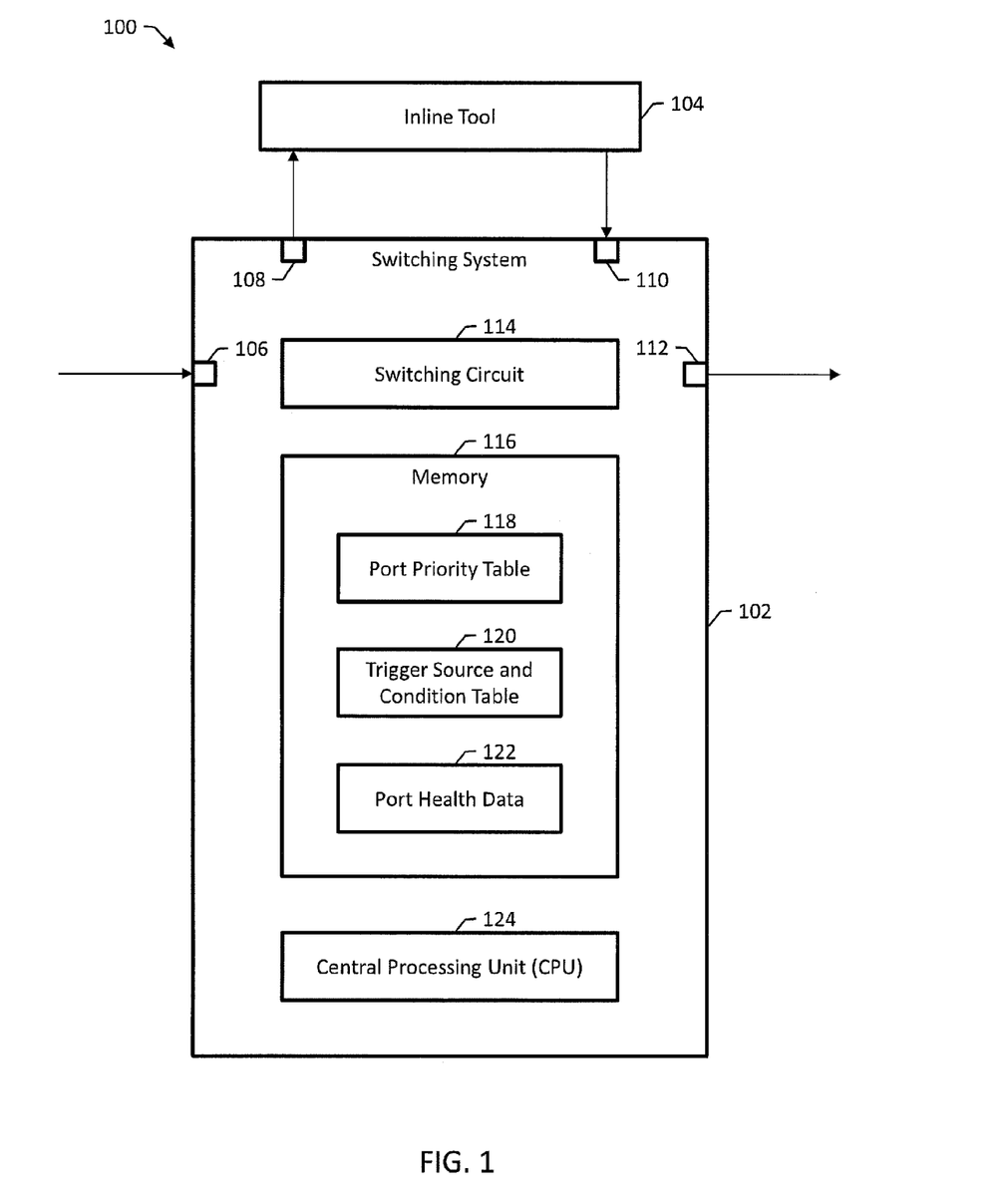
FIG. 1 is a block diagram of an example data communications network system.

FIG. 1 is a block diagram of an example data communications network system 100. The system 100 includes a switching system 102 acting as a bypass switch and an inline tool 104. The switching system 102 is a hardware device that is configured to switch network traffic to the inline tool 104 and to bypass the inline tool 104, e.g., when the switching system 102 determines that the inline tool 104 has failed.

The inline tool 104 is a system configured to inspect and/or control the network traffic, e.g., for security, monitoring, or both. For example, the inline tool 104 can be an intrusion prevention system (IPS), firewall, wireless area network (WAN) optimization device, or a unified threat management system. The inline tool 104 can be a single point of failure in a computer network because if the inline tool 104 fails, e.g., by losing power or having a software crash, network traffic may be unable to travel through the system 100. The switching system 102 can automatically shunt traffic around the inline tool 104 when the inline tool 104 has failed.

The example switching system 102 includes first, second, third, and fourth ports 106, 108, 110, and 112, and in some other examples the switching system 102 can include more or fewer ports. The ports can include, e.g., RJ45 connectors or other appropriate connectors. In some examples, the switching system includes dedicated management ports.

The switching system includes a switching circuit 114 for switching network traffic between the ports. The switching circuit 114 can be implemented in one or more integrated circuits or any appropriate combination or hardware and software. For example, the switching circuit 114 can be implemented in a field-programmable gate array (FPGA) or an application-specific integrated circuit (ASIC), and the switching circuit 114 configuration can be specified using circuit diagrams and/or code written in a hardware description language (HDL).

The switching system 102 includes memory 116 storing a port priority table 118, a trigger source and condition table 120, and port health data 122. The memory 116 can include any appropriate hardware structure for storing data. In some examples, the memory 116 is implemented using registers, e.g., arrays of processor registers implemented within an FPGA. In some examples, the memory 116 is implemented using random access memory (RAM), which can be embedded into an FPGA.

The switching circuit 114 is configured to switch network traffic between the ports based on the port priority table 118, the trigger source and condition table 120, and the port health status data 122. The port priority table 118 specifies, for each port, a destination port for network traffic arriving at the port based on a priority path for the port. The trigger source and condition table 120 specifies the priority path for each port based on whether triggers and conditions listed in the table 120 are met or not met as determined by the port health data 122. The port health data 122 specifies operational conditions at each port, e.g., whether a connected system at each port is responding normally.

The switching system 102 can determine the port health data 122 using any appropriate network diagnostic technique, e.g., by sending periodic heartbeat messages on the ports. If the switching system 102 does not receive an appropriate response from a heartbeat message on a particular port, then switching system 102 can determine that a system connected to that particular port has failed. The failure can be specified in the port health data 122, so that the switching circuit 114 can evaluate the trigger source and condition table 120 in view of the port health data 122 to determine a priority path to use in selecting a destination port from the port priority table 118.

To illustrate the operation of the switching system 102, consider the illustrated example scenario where the switching system 102 is configured as a bypass switch for the inline tool 104. The switching system 102 receives incoming network traffic on the first port 106 and, based on the port priority table 118 and trigger source and condition table 120, routes the incoming network traffic to the second port 108 as a destination port for incoming traffic on the first port 106. The inline tool 104 receives the incoming network traffic and performs some operation on the incoming network traffic, e.g., a monitoring or security operation.

The inline tool 104 then sends the incoming network traffic, which has potentially been modified by the inline tool 104, to the third port 110 of the switching system 102. Based on the port priority table 118 and trigger source and condition table 120, the switching system 102 routes the network traffic from the inline tool 104 to the fourth port 112 as a destination for the third port 110. In this configuration, the first and fourth ports 106 and 112 are configured as network ports and the second and third ports 108 and 110 are configured as monitor ports.

As long as the inline tool 104 is functioning correctly, the switching system 102 may not need to change the routing between the ports. When the switching system determines that the inline tool 104 has failed, e.g., by sending a heartbeat message from the second port 108 and not receiving an appropriate response, then the switching system 102 updates the port health data 122. The switching system 102 evaluates the trigger source and condition table 102 to determine destination ports as specified by the port priority table 118.

The switching system 102 can route the incoming network traffic on the first port 106 to the fourth port 112 as a destination port for the first port 106 so that the network traffic may continue to flow through the system. The functions performed by the inline tool 104 may now need to be performed elsewhere in the network. The switching system 102 can issue an alert to indicate that the inline tool 104 became unavailable, allowing network or security personnel to take appropriate actions. The switching system 102 can continue to send heartbeat messages to the inline tool 104 even after the inline tool 104 stopped responding appropriately, so that the switching system 102 can re-route traffic back through the inline tool 104 when the inline tool 104 becomes operational again.

Having the switching system 102 deployed in front of the inline tool 104 can provide greater deployment flexibility. When the inline tool 104 needs to be removed, e.g., for maintenance, the switching system 102 can be configured to bypass the inline tool 104 and let network traffic flow uninterrupted. Once maintenance is complete, the switching system 102 can route traffic back through the inline tool 104 or its replacement.

In some examples, the switching system includes a central processing unit (CPU) 124 that can include one or more processors or processor cores. The CPU 124 is configured to execute software stored on one or more non-transitory computer readable mediums. The software can be loaded into the memory 116 or into a different memory structure for execution by the CPU 124. The switching circuit 114 is configured to operate independently of the CPU 124, so that the switching circuit 114 can perform fast routing changes using the port priority table 118 and trigger source and condition table 120 without intervention from the CPU 124.

The CPU 124 can be configured, by virtue of suitable programming, to perform management functions for the switching system 102. For example, the CPU 124 can update the values stored in the port priority table 118 and the trigger source and condition table 120 to change the behavior of the switching circuit 114. In some examples, the CPU can provide a graphical user interface (GUI) to a user device of a system administrator, e.g., by sending a web page to a web browser on the user device. The system administrator can use the GUI, e.g., to reconfigure the port priority table 118 and the trigger source and condition table 120, and/or to view network statistics tracked by the switching system.

In some examples, the CPU 124 is configured to execute remote management security. For example, the remote management security can be provided through one or more of Role Based User Access (RBAC), Secure Socket Layer (SSL) encryption, Hypertext Transfer Protocol on SSL (HTTPS), Simple Network Management Protocol (SNMP), Secure Shell (SSH), and an internet protocol (IP) address access list. The CPU 124 can be configured to disable access to management interfaces as appropriate to prevent unwanted access to those interfaces.

Figure 2:
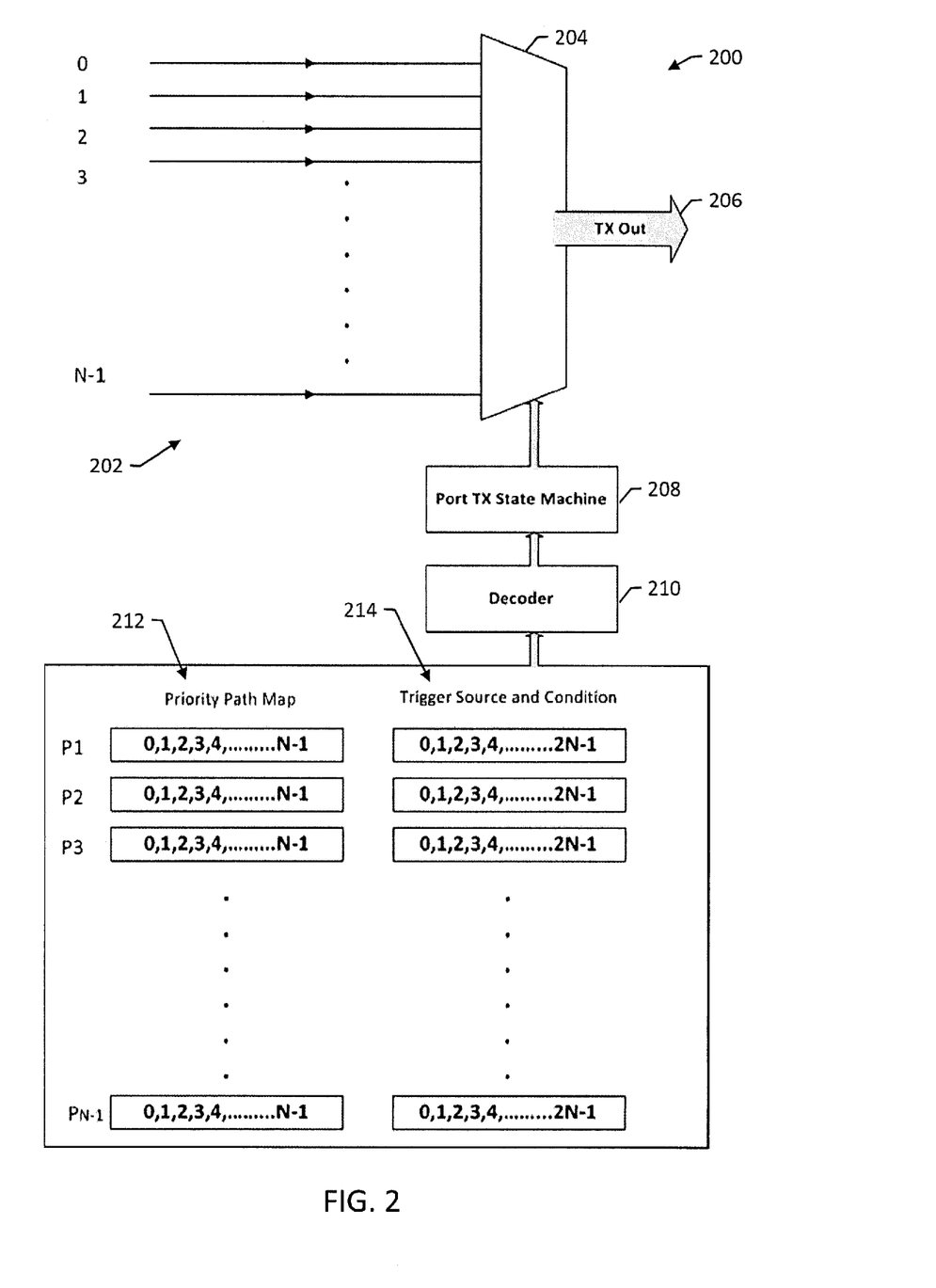
FIG. 2 is a block diagram illustrating the operation of an example switching circuit.

FIG. 2 is a block diagram illustrating the operation of an example switching circuit 200. The switching circuit 200 receives incoming network traffic 202 on N ports (N>1). The switching circuit 200 includes a selector circuit 204, e.g., a multiplexor, to select the incoming network traffic 202 from one of the ports to output as outgoing network traffic 206 on a destination port.

The selector circuit 204 receives a select signal from a port transmit state machine 208, which in turn receives a signal from a decoder 210 that evaluates data stored in a priority path map 212 for the destination port and a trigger source and condition column 214 for the destination port. The priority path map 212 is a subset of the data stored in a port priority table, e.g., the port priority table 118 of FIG. 1, that is associated with the destination port. The trigger source and condition column 214 is a subset of the data stored in trigger source and condition table, e.g., the trigger source and condition table 210 of FIG. 1, that is associated with the destination port.

The priority path map 212 includes N priority paths, from the P1 priority path having the highest priority to the PN-1 priority path having the lowest priority. In the example illustrated, each priority path corresponds to a register storing N bits, so that the priority path map 212 includes N registers of N bits. A given register for a priority path specifies which port of incoming traffic 202 should be selected. Taken together, the priority paths can specify how all of the network traffic at the switching circuit 200 should be routed by the switching circuit 200.

For example, suppose that the system includes eight ports (N=8). If P1 for port 1 is set to 8'b0001_0000 and P2 for port 1 is set to 8'b0000_0010, that indicates that the switching circuit 200 should first route network traffic from port 5 to port 1 at the highest priority path. At the next highest priority path, when a system connected to port 5 has been determined to have failed, the switching circuit 200 should route network traffic from port 2 to port 1.

The trigger source and condition column 214 contains data that indicates when the switching circuit 200 should transition from one priority path to another. The column can include N registers, and each register can store any number of bits that is greater than N based on the application. For example, consider the example system with eight ports discussed in the previous paragraph, where each register in the trigger source and condition column includes 2N bits. The lower 8 bits can be mapped to trigger sources and the upper 8 bits can specify conditions. If the condition specified by the upper 8 bits exists at the port specified by the lower 8 bits, then the switching circuit changes priority paths.

If the trigger source and condition for port 1, priority path P1 is set to 16'b0000_0000_0000_0000, that indicates that the switching circuit 200 should always connect port 1 to port 5 at the highest priority path if port 5 is operating normally. The switching circuit 200 determines that port 5 is operating normally, e.g., using port health data. In that situation, no trigger source and condition is needed.

Suppose that the trigger source and condition for port 1, priority path P2 is set to 16'b0000_0100_0001_0000. The lower 8 bits are mapped to the 8 ports, so the trigger source for port 1, priority path P2 is port 5. This indicates that a change in the port health status for port 5 can trigger a change to a different priority path for port 1 if the current priority path for port 1 is priority path P2, e.g., it can indicate that the switching circuit 200 should use the next lower priority path for port 1, priority path P3.

The condition 8 bits can be defined by a system administrator or developer based on the application. For example, suppose that the switching circuit 200 is being used in a bypass switch. The bit set on the upper 8 bits can correspond to a "bypass on" condition, i.e., indicating that the bypass switch is currently bypassing an inline tool. If the condition is met, i.e., if the bypass switch is currently bypassing an inline tool, then the condition can trigger a change in the current priority path for that port. The number of condition bits can be flexible based on the design needs.

The decoder 210 and the port transmit state machine 208 are configured to determine which data path of the selector circuit 204 based on the priority path map 212, the trigger source and condition column 214, and the port health data that can be collected in real-time or near real-time. The decoder 210, port transmit state machine 208, and selector circuit 204 logic can be implemented and integrated in an FPGA.

Figure 3:
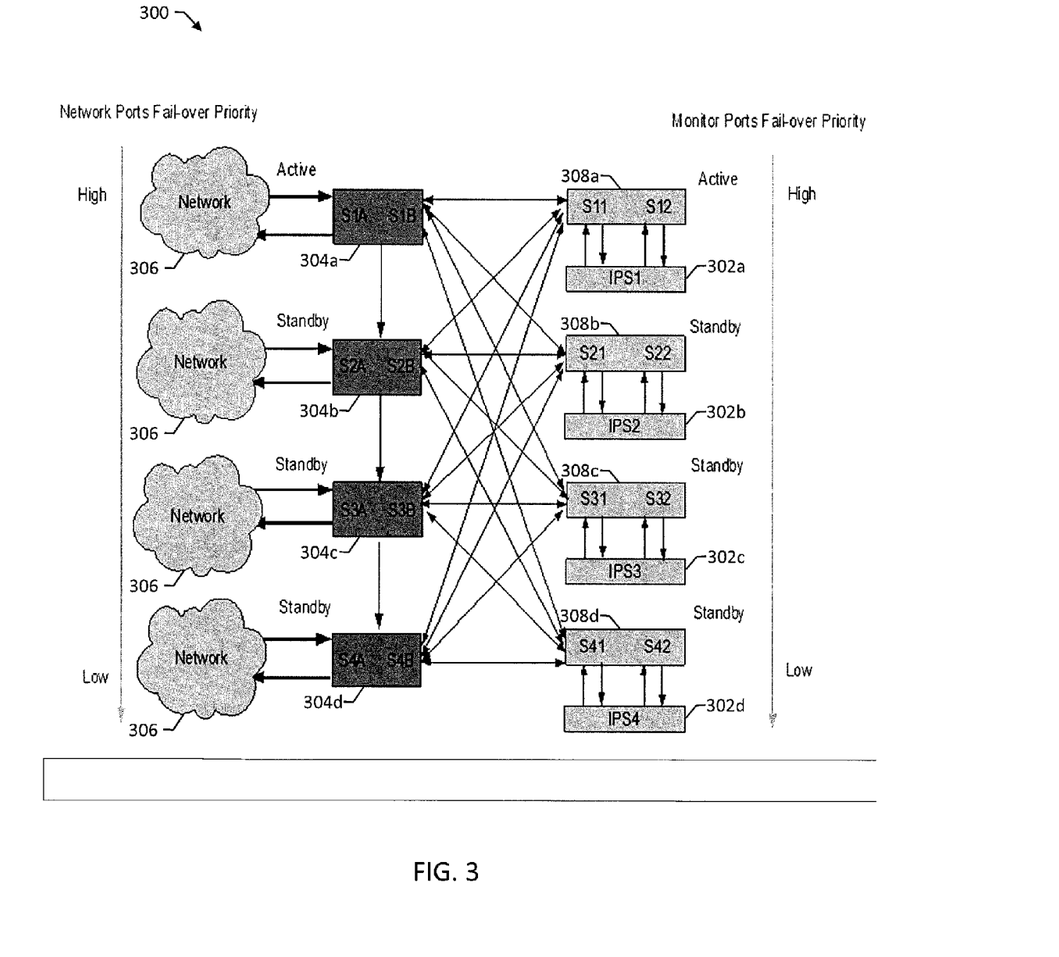
FIG. 3 is a diagram of an example active-passive network environment using a 16 port network bypass switch.

FIG. 3 is a diagram of an example active-passive network environment 300 using a 16 port network bypass switch. The network bypass switch includes four segments, segments 1-4, which are comprised of 8 network ports and 8 monitor ports. The network environment 300 provides high-availability network security using redundant intrusion prevention systems (IPSs) 302a-d, some of which are in an active mode and some of which are in a standby mode that can take the place of the active systems when appropriate. The 16 port network bypass switch can be implemented using the switching system 102 of FIG. 1.

The network environment 300 includes a number of network ports 304a-d, illustrated on the left side of the diagram, which are bypass switch network ports A&B of segments 1 through 4 in the 16 port bypass switch. The network ports 304a-d are connected to a data communications network 306 and to monitor ports 308a-d, illustrated on the right side of the diagram, which are the monitor ports of segments 1 through 4 in the 16 port bypass switch.

The network ports 304a-d can be configured in a priority order, illustrated in the diagram as ranging from the highest priority at the top of the diagram to the lowest priority at the bottom of the diagram. The monitor ports 308a-d are also configured in a priority order, illustrated in the diagram as ranging from the highest priority at the top of the diagram to the lowest priority in the bottom of the diagram.

Initially, the highest priority monitor ports 304a are in an active state, so that the monitor ports 304a are routing network traffic to the highest priority monitor ports 308a, which are also in an active state. If the highest priority monitor ports 308a or the corresponding IPS 302a fails, one of the other segments can be brought into an active mode and the highest priority network ports 304a can route traffic to that monitor port. If the highest priority network ports 304a fail, one of the other segments can be brought into an active mode and network traffic can be routed through that network port. If all of the IPSs 302a-d fail, the network ports 304a-d can all be put into a bypass mode so that network traffic can continue to flow.

Figure 4:
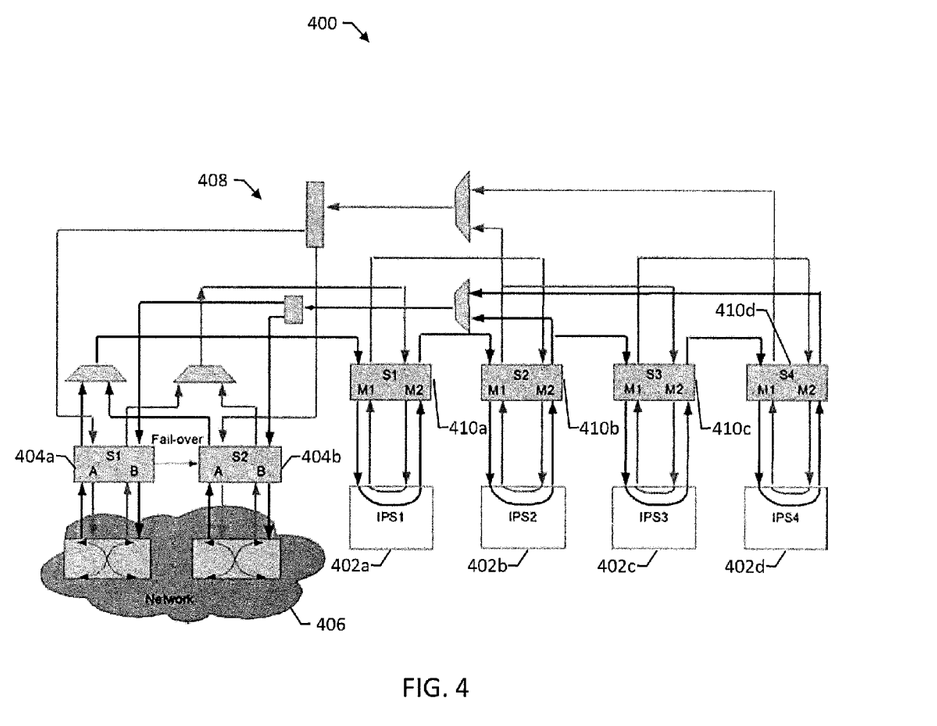
FIG. 4 is a diagram of an example active-active network environment using a 16 port network bypass switch.

FIG. 4 is a diagram of an example active-active network environment 400 using a 16 port network bypass switch. The network environment 400 provides high-availability network security using intrusion prevention systems (IPSs) 402a-d that are all active and operating in parallel. The 16 port network bypass switch can be implemented using the switching system 102 of FIG. 1.

A pair of network ports 404a-b route network traffic from a data communications network 406 into a network 408 of selector circuits and a number of monitor ports 410a-d that route traffic to the IPSs 402a-d. If a single IPS fails or otherwise becomes unavailable, the segment for that IPS will bypass network traffic to another segment, which can then route the network traffic to the corresponding IPS for that segment. If all of the IPSs fail, creating a fail-over condition, the network ports 404a-b can bypass the entire network 408 of selector circuits and security switches.

Figure 5:
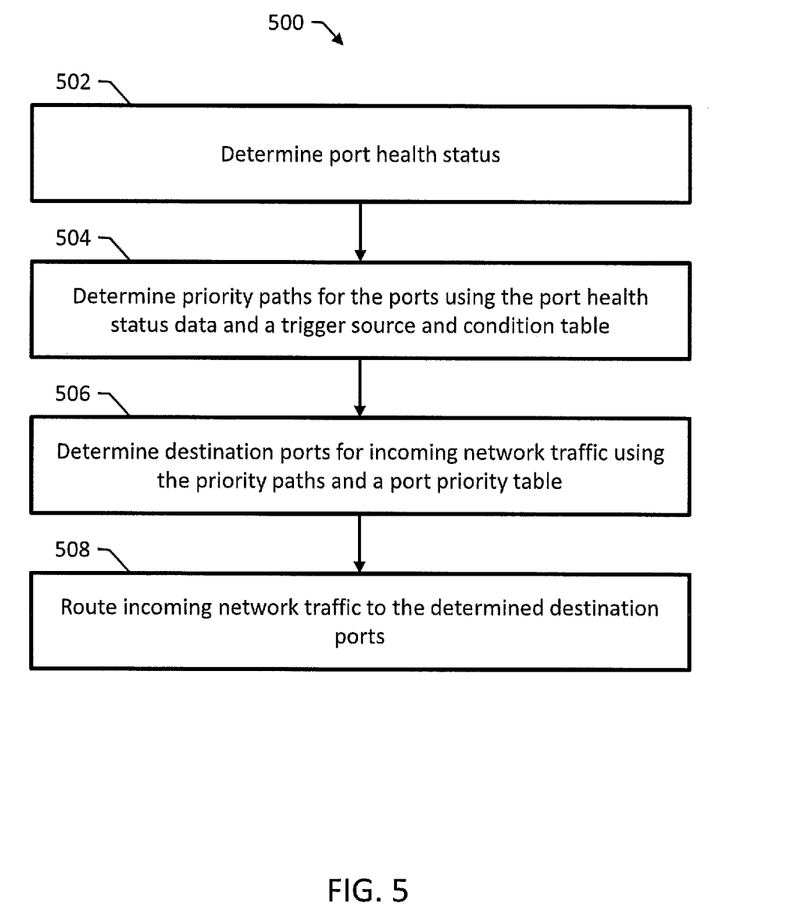
FIG. 5 is a flow diagram of a method for switching network traffic between a number of ports.

FIG. 5 is a flow diagram of a method 500 for switching network traffic between a number of ports. The method 500 can be performed by a switching system, e.g., the switching system 102 of FIG. 1. For purposes of illustration, the method 500 will be described with respect to a system that performs the method.

The system determines port health status for the ports of the system (502). Determining port health status can include sending heartbeat messages on the ports and/or performing any appropriate network diagnostic techniques for assessing the health of the ports. The system can record the results of determining the port health status as port health status data.

The system determines priority paths for the ports using the port health status data and a triggers source and condition table (504). The system determines destination ports for incoming network traffic using the priority paths and a port priority table (506). The port priority table specifies, for each port, a priority ordered list of destination ports for the port, and the trigger source and condition table specifies destination ports from the priority ordered lists based on the port health status data. The system routes incoming network traffic to the determined destination ports (508).

Determining the priority paths can include determining that a port specified in the trigger source and condition table has failed according to the port health status data. Determining the priority paths can include determining that a condition specified in the trigger source and condition table has been met. In some examples, the system is configured to act as a bypass switch, so that at least two of the ports are network ports and at least two of the ports are monitor ports.

In some examples, the system includes a switching circuit implemented in an FPGA, a separate central processing unit (CPU), and a number of registers implemented in the FPGA for storing the port priority table and the trigger source and condition table. The switching circuit can switch network traffic without using the CPU to reconfigure the switching circuit, which can improve the speed of the system in responding to events that require different priority paths to be used in the switching system.

In some examples, the system includes a decoder for determining the priority path. The system can also include a state machine for causing a switching circuit to route incoming network traffic based on an output of the decoder.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for network switching, the system comprising:
    memory storing a port priority table and a trigger source and condition table; and
    a switching circuit for switching network traffic between a plurality of ports based on the port priority table, the trigger source and condition table, and port health status data, wherein switching network traffic comprises:
        determining a priority path for a first port using the port health status data and the trigger source and condition table, wherein the port priority table specifies, for each port, a priority ordered list of destination ports for the port, and wherein the trigger source and condition table specifies destination ports from the priority ordered lists based on the port health status data;
        determining a second port specified as a destination for network traffic arriving at the first port by the port priority table for the priority path; and
        routing incoming network traffic from the first port to the second port.

2. The system of claim 1, wherein the switching circuit comprises a decoder for determining the priority path and the second port, and wherein the switching circuit comprises a state machine for causing the switching circuit to route traffic from the first port to the second port based on an output of the decoder.

3. The system of claim 1, wherein the switching circuit is implemented in a field-programmable gate array (FPGA).

4. The system of claim 1, comprising a central processing unit (CPU), wherein switching network traffic comprises switching network traffic without using the CPU to reconfigure the switching circuit.

5. The system of claim 1, wherein the system is configured to determine the port health data by periodically sending heartbeat messages on the ports and determining the port health data based on responses or the absence of a response.

6. The system of claim 1, wherein the system includes N ports (N>1), and wherein the memory includes N priority path registers, one for each port, collectively storing the port priority table, and wherein the memory includes at least N trigger and source condition registers collectively storing the trigger source and condition table.

7. The system of claim 1, wherein the system is configured to act as a bypass switch, and wherein at least two of the ports are network ports and at least two of the ports are monitor ports.

8. The system of claim 1, wherein determining the priority path for the first port using the port health status data and the trigger source and condition table comprises determining that a port specified in the trigger source and condition table has failed according to the port health status data.

9. The system of claim 1, wherein determining the priority path for the first port using the port health status data and the trigger source and condition table comprises determining that a condition specified in the trigger source and condition table has been met.

10. A method performed by a switching circuit for switching network traffic between a plurality of ports based on a port priority table, a trigger source and condition table, and port health status data, the method comprising:
    determining a priority path for a first port using the port health status data and the trigger source and condition table, wherein the port priority table specifies, for each port, a priority ordered list of destination ports for the port, and wherein the trigger source and condition table specifies destination ports from the priority ordered lists based on the port health status data;
    determining a second port specified as a destination for network traffic arriving at the first port by the port priority table for the priority path; and
    routing incoming network traffic from the first port to the second port.

11. The method of claim 10, wherein the switching circuit comprises a decoder for determining the priority path and the second port, and wherein the switching circuit comprises a state machine for causing the switching circuit to route traffic from the first port to the second port based on an output of the decoder.

12. The method of claim 10, wherein the switching circuit is implemented in a field-programmable gate array (FPGA).

13. The method of claim 10, comprising switching network traffic without using a central processing unit (CPU) to reconfigure the switching circuit.

14. The method of claim 10, wherein the system is configured to determine the port health data by periodically sending heartbeat messages on the ports and determining the port health data based on responses or the absence of a response.

15. The method of claim 10, comprising switching network traffic between N ports (N>1), and wherein switching network traffic comprises accessing memory comprising N priority path registers, one for each port, collectively storing the port priority table, and wherein the memory includes at least N trigger and source condition registers collectively storing the trigger source and condition table.

16. The method of claim 10, wherein switching network traffic comprises acting as a bypass switch, and wherein at least two of the ports are network ports and at least two of the ports are monitor ports.

17. The method of claim 10, wherein determining the priority path for the first port using the port health status data and the trigger source and condition table comprises determining that a port specified in the trigger source and condition table has failed according to the port health status data.

18. The method of claim 10, wherein determining the priority path for the first port using the port health status data and the trigger source and condition table comprises determining that a condition specified in the trigger source and condition table has been met.

19. A non-transitory computer readable medium having stored thereon executable instructions that when executed by the processor of a computer control the computer to perform steps comprising:

determining a priority path for a first port using port health status data and a trigger source and a condition table, wherein a port priority table specifies, for each port, a priority ordered list of destination ports for the port, and wherein the trigger source and condition table specifies destination ports from the priority ordered lists based on the port health status data;

determining a second port specified as a destination for network traffic arriving at the first port by the port priority table for the priority path; and     routing incoming network traffic from the first port to the second port.

\* \* \* \* \*